United States Patent
Shin et al.

(10) Patent No.: US 10,558,393 B2
(45) Date of Patent: Feb. 11, 2020

(54) CONTROLLER HARDWARE AUTOMATION FOR HOST-AWARE PERFORMANCE BOOSTER

(71) Applicant: QUALCOMM Incorporated, San Diego, CA (US)

(72) Inventors: Hyunsuk Shin, San Diego, CA (US); David Teb, Haifa (IL); Hung Vuong, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 43 days.

(21) Appl. No.: 15/789,903

(22) Filed: Oct. 20, 2017

(65) Prior Publication Data
US 2019/0121540 A1    Apr. 25, 2019

(51) Int. Cl.
*G06F 3/06* (2006.01)
*G06F 12/02* (2006.01)

(52) U.S. Cl.
CPC .......... *G06F 3/0659* (2013.01); *G06F 3/0626* (2013.01); *G06F 3/0658* (2013.01); *G06F 3/0661* (2013.01); *G06F 3/0688* (2013.01); *G06F 12/0246* (2013.01); *G06F 2212/7201* (2013.01)

(58) Field of Classification Search
CPC .............................................. G06F 2212/7201
See application file for complete search history.

(56) References Cited

U.S. PATENT DOCUMENTS

| | | | |
|---|---|---|---|
| 8,285,920 B2 | 10/2012 | Mylly | |
| 9,329,991 B2 | 5/2016 | Cohen et al. | |
| 2009/0313416 A1* | 12/2009 | Nation | G06F 12/0638 711/100 |
| 2010/0023800 A1* | 1/2010 | Harari | G06F 11/1068 714/2 |
| 2014/0195725 A1* | 7/2014 | Bennett | G06F 12/0246 711/103 |
| 2014/0310536 A1 | 10/2014 | Shacham | |
| 2014/0337560 A1* | 11/2014 | Chun | G06F 12/0246 711/103 |
| 2015/0046634 A1 | 2/2015 | Maeda et al. | |
| 2015/0046670 A1 | 2/2015 | Kim et al. | |
| 2015/0143035 A1* | 5/2015 | Choi | G06F 3/0061 711/103 |

(Continued)

OTHER PUBLICATIONS

Patterson et al. Computer Architecture: A Quantitative Approach. 1996. Morgan Kaufmann. 2nd ed. pp. 503-504, 565-573. (Year: 1996).*

(Continued)

*Primary Examiner* — Nathan Sadler
(74) *Attorney, Agent, or Firm* — Muncy, Geissler, Olds & Lowe, P.C.

(57) ABSTRACT

A system is proposed to enable a hardware based host controller to perform operations related to Host-aware Performance booster (HPB). The host controller may retrieve a command packet from a host memory targeting a logical address of a storage location of the storage device, may retrieve a physical address of the storage device mapped to the logical address from the address map, and may send the command packet to the storage device. The sent command packet may have the physical address incorporated therein.

35 Claims, 12 Drawing Sheets

(56) References Cited

U.S. PATENT DOCUMENTS

| | | | |
|---|---|---|---|
| 2015/0154111 A1 | 6/2015 | D'Abreu et al. | |
| 2015/0278118 A1 | 10/2015 | Lee et al. | |
| 2016/0124649 A1* | 5/2016 | Liu | G06F 3/064 |
| | | | 711/103 |
| 2017/0109089 A1* | 4/2017 | Huang | G06F 3/0622 |
| 2017/0192902 A1 | 7/2017 | Hwang et al. | |
| 2017/0364459 A1* | 12/2017 | Bandic | G06F 13/1615 |
| 2018/0095662 A1* | 4/2018 | Brennan | G06F 3/061 |
| 2019/0065395 A1* | 2/2019 | Fujita | G06F 12/1009 |
| 2019/0102291 A1* | 4/2019 | Zhou | G06F 3/0659 |
| 2019/0108131 A1* | 4/2019 | Lee | G06F 12/1009 |

OTHER PUBLICATIONS

Jeong et al. "Improving Flash Storage Performance by Caching Address Mapping Table in Host Memory." Jul. 2017. USENIX. HotStorage '17. (Year: 2017).*

Jeong W., et al., "Improving Flash Storage Performance by Caching Address Mapping Table in Host Memory", USENIX Workshop on Hot Topics in Storage and File Systems (HotStorage 17), Jul. 11, 2017, 20 Pages.

International Search Report and Written Opinion—PCT/US2018/052236—ISA/EPO—dated Dec. 21, 2018.

* cited by examiner

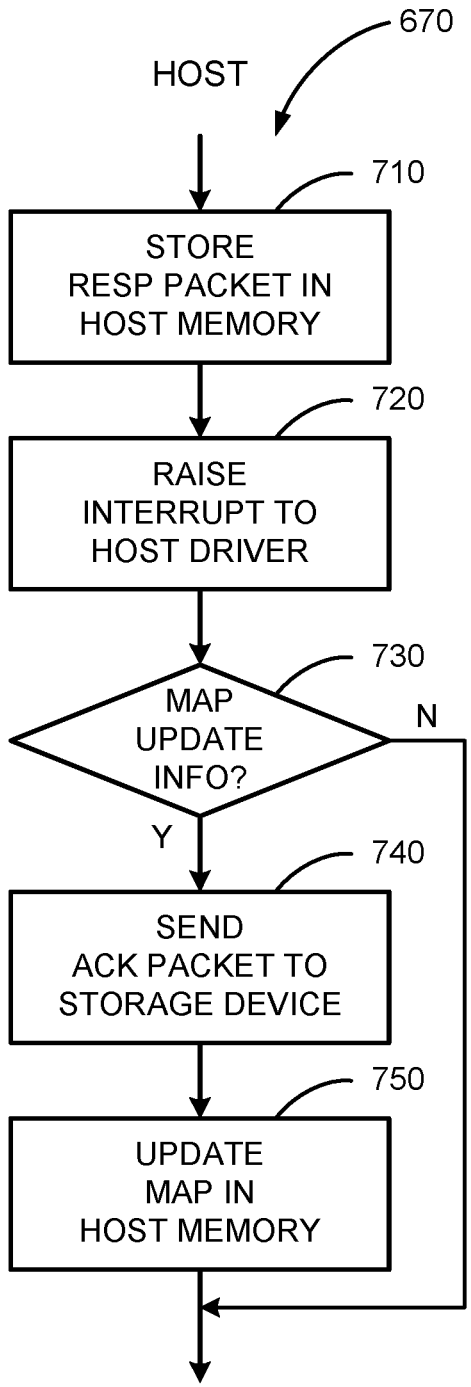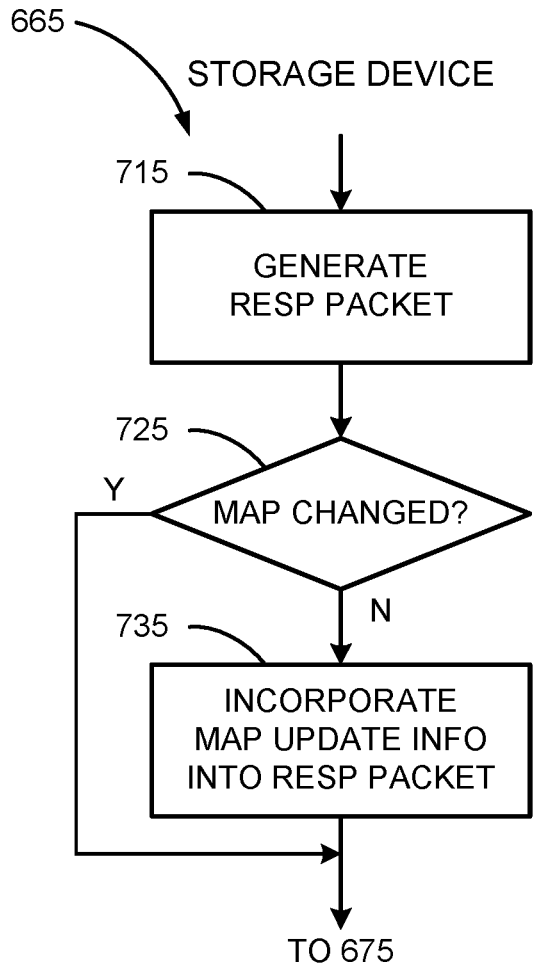
FIG. 7A
FIG. 7B

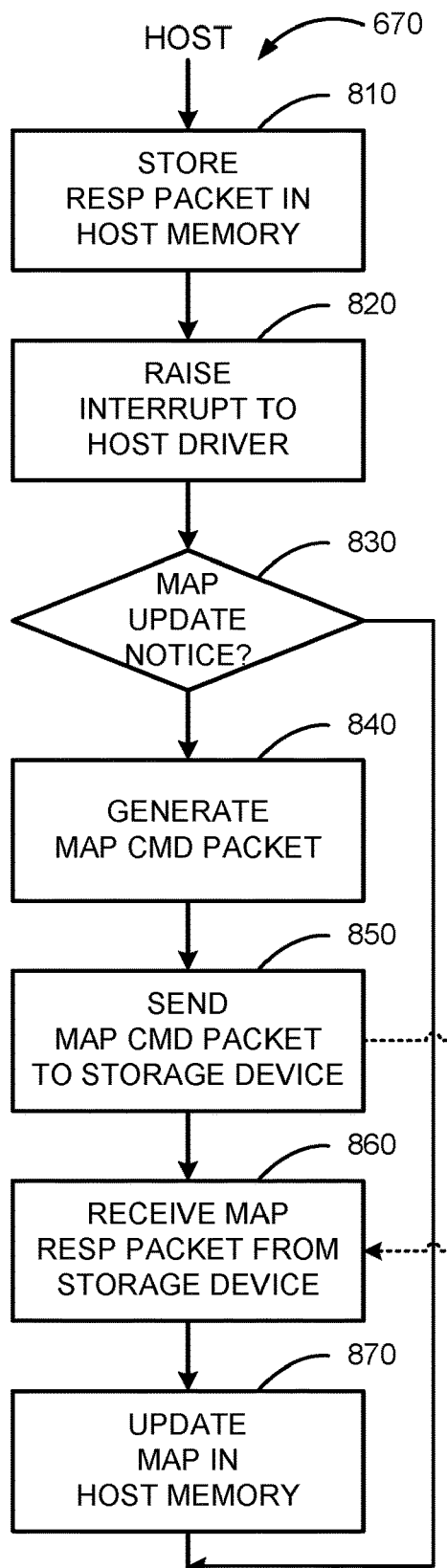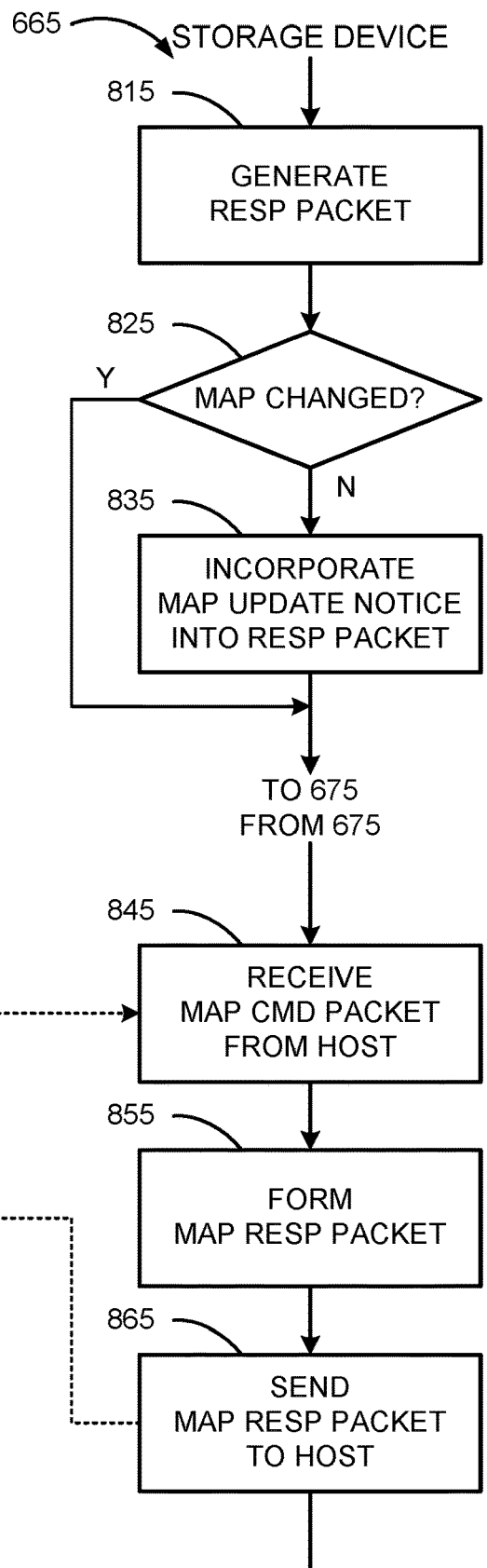
FIG. 8A
FIG. 8B

CONTROLLER HARDWARE AUTOMATION FOR HOST-AWARE PERFORMANCE BOOSTER

FIELD OF DISCLOSURE

One or more aspects of the present disclosure generally relate to storage devices, and in particular, to apparatuses incorporating controller H/W (Hardware) automation for HPB (Host-aware Performance Booster), e.g., for UFS (Universal Flash Storage) devices.

BACKGROUND

JEDEC (Joint Electron Device Engineering Council) promulgates several standards including the UFS standard for high performance mobile storage devices. The UFS has adopted MIPI (Mobile Industry Processor Interface) for data transfer in mobile systems. The UFS is a standard to provide high-performance serial interface for moving data between a host and a storage device.

FIG. 1 illustrates a conventional UFS system that includes a UFS host 110 and a UFS device 170 configured to communicate with each other over a lane. The UFS host 110 includes a UFS host controller 115, and the UFS device 170 includes a RAM (random access memory) 185 and a flash memory 195. In FIG. 1, operations represented by circled numbers (1) and (2) represent a typical command-response communication sequence between the UFS host 110 and the UFS device 170. For example, operation (1) may be a command (e.g., read, write), and operation (2) may be a response (e.g., success or failure) to the command.

When accessing the UFS device 170 for read and write, the UFS host controller 115 issues the command based on an LBA (logical block address) associated with the UFS device 170. For example, (1) may be in a form of "command (LBA=a)". The UFS device 170 performs an L2P (logical-to-physical) mapping to find a PBA (physical block address) corresponding to the given LBA, then accesses the physical memory location of the flash memory 195 to service the command.

The entire L2P map for the UFS device 170 is in the flash memory 195. However, to enable faster mapping, the L2P map can be stored in the RAM 185. A typical ratio between the L2P map and the total storage capacity is 1:1000. For example, if the storage capacity of the UFS device 170 (e.g., capacity of the flash memory 195) is 256 GB, then to store the entire L2P map in the RAM 185, the RAM 185 should have a 256 MB capacity. Unfortunately, a typical UFS device has a limited amount of SRAM (e.g., 1-2 MB). Thus, only a portion of the L2P map is stored in the RAM 185.

If the received command specifies an LBA that belongs to the L2P map portion in the RAM 185 (e.g., if LBA=a), the corresponding PBA (e.g., PBA=A) can be found relatively quickly. However, if the received command has an LBA that does not belong to the L2P map portion currently in the RAM 185 (e.g., if LBA=c), the missing L2P map portion is read from the flash memory 195, and then the corresponding PBA (e.g., PBA=C) is found. This can lead to significant performance impact whenever the received LBA is not in the RAM 185. The problem can be especially acute when the RAM 185 is very small compared to the flash memory 195 since it is more likely that the received LBA will not be in the RAM 185.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary apparatus is disclosed. The apparatus may comprise a host configured to communicate with a storage device. The host may comprise a host controller configured to communicate with a host driver and with the storage device. The host may also comprise a host memory configured to store an address map for the storage device. The address map may comprise one or more L2P (logical-to-physical) address translation entries for the storage device. The host controller may be configured to receive a trigger from a host driver indicating that a command packet is in the host memory. The command packet may include a logical address of a storage location of the storage device. The host controller may also be configured to retrieve the command packet from the host memory, retrieve a physical address of the storage device mapped to the logical address from the address map, incorporate the physical address into the command packet, and send the command packet with the physical address incorporated therein to the storage device.

Another exemplary apparatus is disclosed. The apparatus may comprise a host and a storage device configured to communicate with each other. The host may comprise a host controller configured to communicate with a host driver and with the storage device. The host may also comprise a host memory configured to store an address map for the storage device. The address map may comprise one or more L2P address translation entries for the storage device. The host controller may be configured to receive a trigger from a host driver indicating that a command packet is in the host memory. The command packet may include a logical address of a storage location of the storage device. The host controller may also be configured to retrieve the command packet from the host memory, retrieve a physical address of the storage device mapped to the logical address from the address map, incorporate the physical address into the command packet, and send the command packet with the physical address incorporated therein to the storage device.

An exemplary method of an apparatus is disclosed. The apparatus may comprise a host and a storage device configured to communicate with each other. The method may comprise receiving, by a host controller of the host, a trigger from a host driver indicating that a command packet is in a host memory. The command packet may include a logical address of a storage location of the storage device. The method may also include retrieving, by the host controller, the command packet from the host memory, and include retrieving, by the host controller, a physical address of the storage device mapped to the logical address from an address map for the storage device stored in the host memory. The address map may comprise one or more L2P address translation entries for the storage device. The method may further comprise incorporating, by the host controller, the physical address into the command packet, and include sending, by the host controller, the command packet with the physical address incorporated therein to the storage device. The host controller may be implemented in hardware, and the host driver may be implemented through a processor executing instructions of a device driver software.

Yet another exemplary apparatus is disclosed. The apparatus may comprise a host configured to communicate with a storage device. The host may comprise a host controller configured to communicate with a host driver and with the storage device. The host may also comprise a host memory configured to store an address map for the storage device. The address map may comprise one or more L2P address translation entries for the storage device. The host controller may comprise means for receiving a trigger from a host driver indicating that a command packet is in the host memory. The command packet may include a logical address of a storage location of the storage device. The host controller may also comprise means for retrieving the command packet from the host memory, means for retrieving a physical address of the storage device mapped to the logical address from the address map, means for incorporating the physical address into the command packet, and means for sending the command packet with the physical address incorporated therein to the storage device. The host controller may be implemented in hardware, and the host driver may be implemented through a processor executing instructions of a device driver software.

BRIEF DESCRIPTION OF THE DRAWINGS

The accompanying drawings are presented to aid in the description of examples of one or more aspects of the disclosed subject matter and are provided solely for illustration of the examples and not limitation thereof:

FIGS. 7A and 7B illustrate flow charts of an example process for hardware oriented device-initiated HPB map update handling;

FIGS. 8A and 8B illustrate flow charts of an example process for hardware oriented host-initiated HPB map update handling.

DETAILED DESCRIPTION

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer-readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Recall from above that one disadvantage (of which there can be several) of a conventional UFS system is the very limited amount of space in the RAM 185 to hold the L2P map of the UFS device 170, which can lead to a significant negative performance impact. To alleviate such issues, HPB (Hardware-aware Performance Booster) features are being discussed in the industry. In HPB, the whole L2P map is stored in a DRAM of the host.

Figure 1:
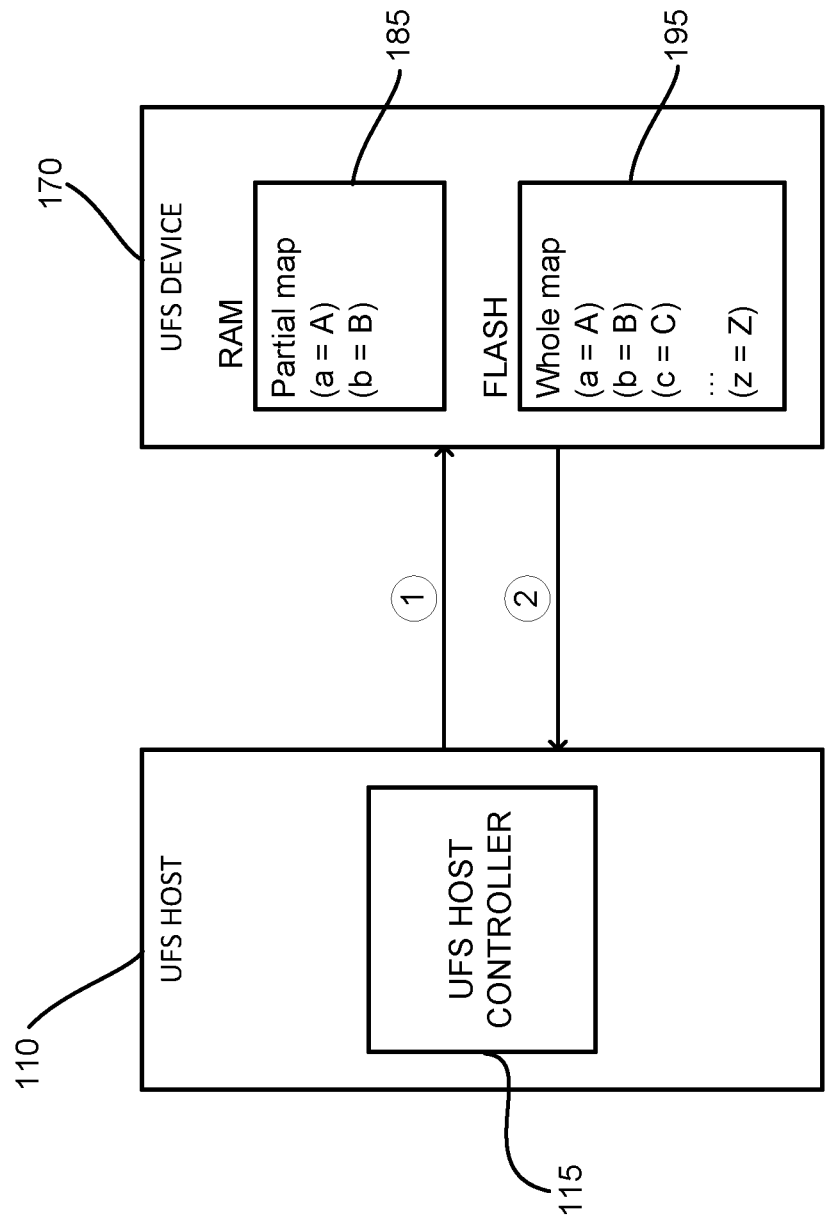
FIG. 1 illustrates a conventional UFS system with a UFS host and a UFS device connected to each other.
Figure 2:
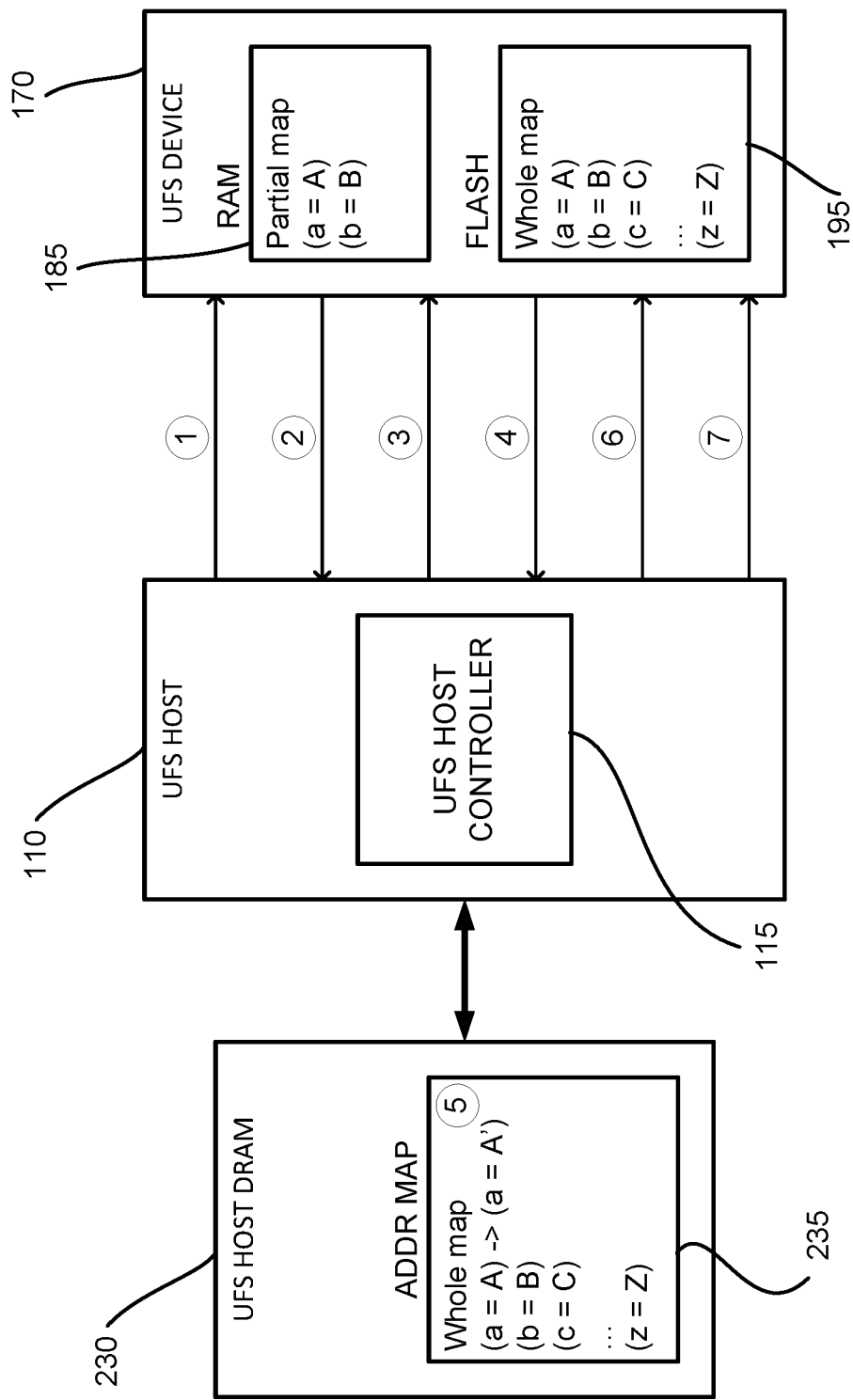
FIG. 2 illustrates a conventional UFS system for implementing HPB features.

FIG. 2 illustrates an example of a UFS system for implementing the HPB features. Similar to the UFS system of FIG. 1, the UFS system of FIG. 2 includes the UFS host 110 and the UFS device 170. The UFS host 110 includes the UFS host controller 115, and the UFS device 170 includes the RAM 185 and the flash memory 195. But in addition, the UFS system in FIG. 2 also includes a UFS host DRAM (dynamic RAM) 230.

As seen, an entire L2P map of the UFS device 170 is stored in the UFS host DRAM 230 as an address map 235. When the UFS host 110 issues a command to the UFS device 170, the UFS host 110 includes the target LBA and the corresponding PBA in the command Since the PBA is also provided, the UFS device 170 does not need to search the L2P map portion in the RAM 185 and does not need to read the missing L2P map portion from the flash memory 195. Therefore, the penalty associated with address translation is avoided.

From time to time, the UFS device 170 updates its L2P map. For example, the UFS device 170 may perform wear leveling for the flash memory 195. When the L2P map within the UFS device 170 changes, the UFS device 170 sends its updated L2P map information to the UFS host 110 so that the address map 235 stored in the UFS host DRAM 230 can be updated as well. The UFS host 110 acknowledges the receipt of the map update information. For subsequent commands to access the same LBA, the UFS host 110 attaches the updated PBA.

Circled numbers (1)-(7) represent an example sequence of operations performed by the UFS host 110 and the UFS device 170 to utilize the HPB features:

(1) The UFS host 110 issues a command with both LBA and corresponding PBA, e.g., "Command (LBA=a, PBA=A)";
(2) The UFS device 170 responds;
(3) The UFS host 110 issues another command e.g., "Command (LBA=c, PBA=C)";
(4) The UFS device 170 responds, and includes an update to the L2P map, e.g., "Response (update (a=A'))";
(5) The UFS host 110 updates the address map 235;
(6) The UFS host 110 acknowledges the receipt of the update information to the UFS device 170, e.g., "Acknowledge (update received)"; and
(7) The UFS host 110 issues a command with the updated map information, e.g., "Command (LBA=a, PBA=A')".

Figure 3:
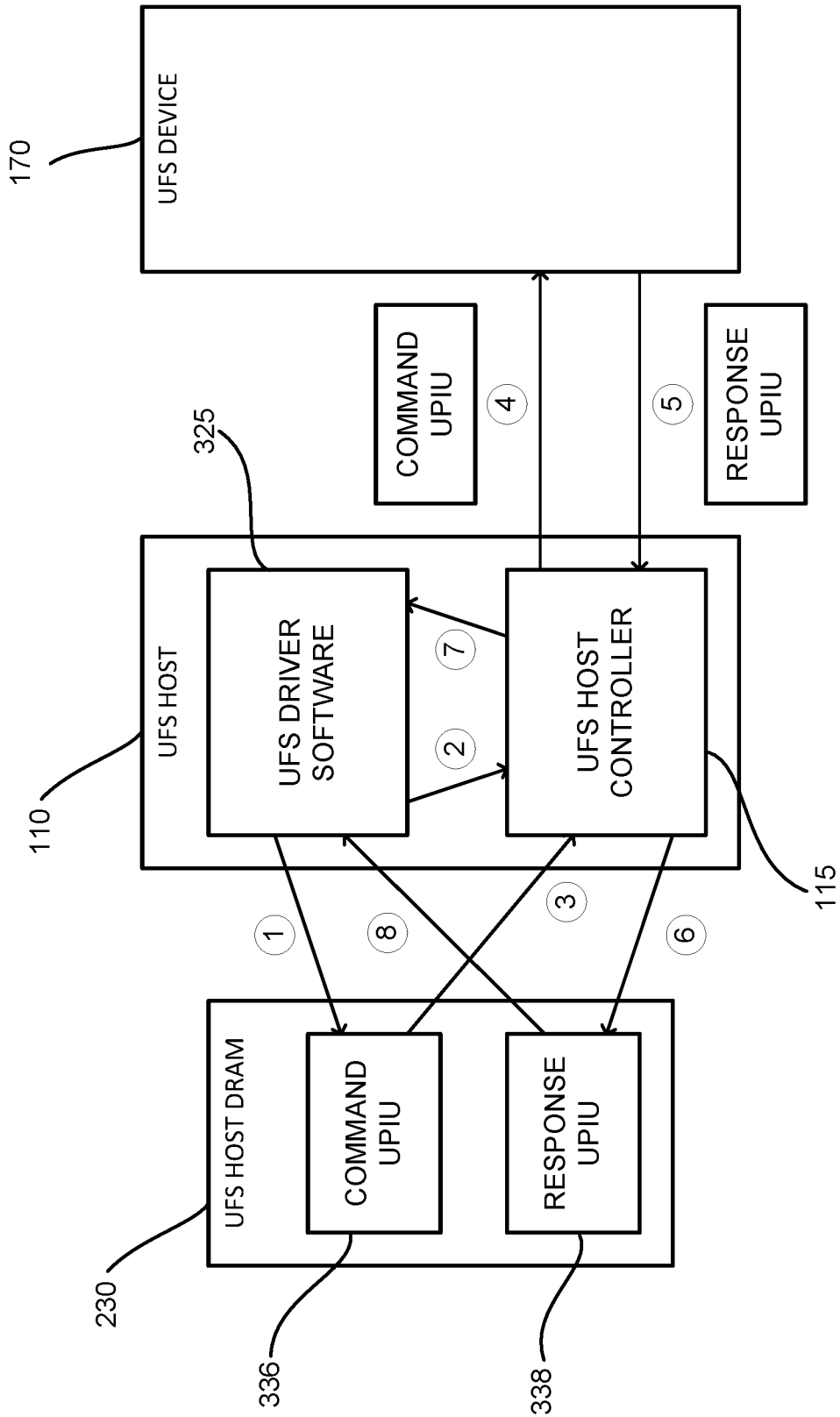
FIG. 3 illustrates a UFS host operation in detail.

FIG. 3 illustrates the operation of the UFS host 110 in more detail. So as to minimize clutter, the address map 235 of the UFS host DRAM 230 and the RAM 185 and the flash memory 195 of the UFS device 170 are omitted. As seen, the UFS host 110 includes UFS driver software 325 in addition to the UFS host controller 115. As the name implies, the UFS driver software 325 is primarily software based. On the other hand, the UFS host controller 115 is primarily hardware based. The sequence of operations (represented by the circled numbers) performed by the UFS driver software 325 and the UFS host controller 115 are as follows:

(1) The UFS driver software 325 prepares a command UPIU (UFS Protocol Information Unit) 336 in the UFS host DRAM 230;
(2) The UFS driver software 325 triggers the UFS host controller 115 to issue the command UPIU 336 to the UFS device 170;
(3) The UFS host controller 115 fetches the command UPIU 336 from the UFS host DRAM 230;
(4) The UFS host controller 115 sends the command UPIU 336 to UFS device 170;
(5) The UFS host controller 115 receives a response UPIU 338 from the UFS device 170;
(6) The UFS host controller 115 stores the response UPIU 338 into the UFS host DRAM 230;
(7) The UFS host controller 115 raises an interrupt to the UFS driver software 325; and
(8) The UFS driver software 325 checks the response UPIU 338 for pass/fail.

Figure 4A:
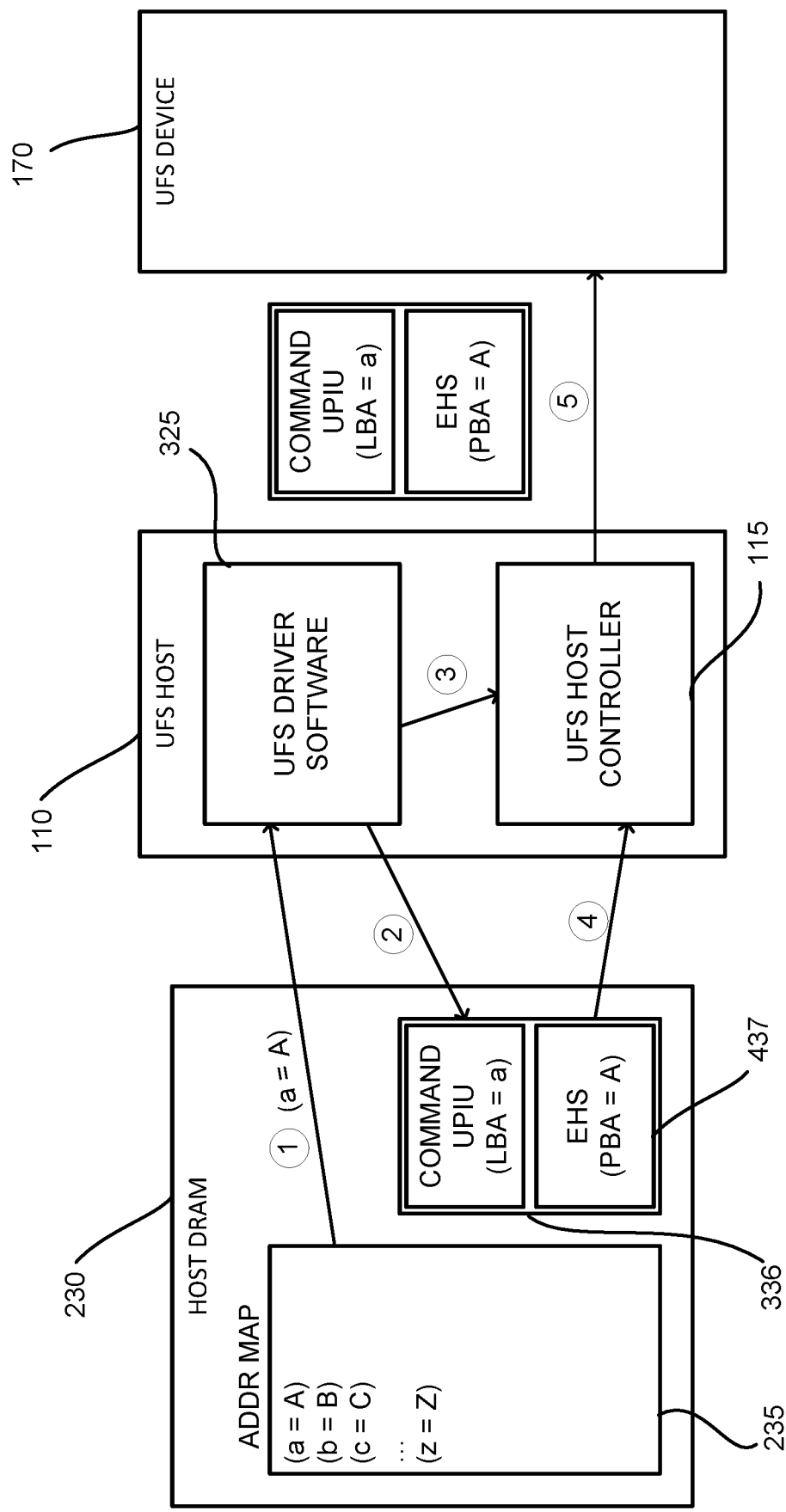
FIGS. 4A and 4B illustrate examples of software oriented HPB handling.

FIG. 4A illustrates an example of a software oriented operation sequence to issue a command utilizing the HPB features. To issue a command to access a target LBA, the UFS driver software 325 accesses the address map 235 to find a corresponding PBA, and attaches the PBA in an EHS (Extended Header Segment) 437 of a command UPIU 336. The sequence of operations (represented by the circled numbers) performed by the UFS driver software 325 and the UFS host controller 115 is as follows:

(1) The UFS driver software 325 retrieves the PBA corresponding to the target LBA from the address map 235, e.g., "(a=A)";
(2) The UFS driver software 325 prepares the command UPIU 336 in the UFS host DRAM 230. The prepared command UPIU 336 includes the target LBA (e.g., "(LBA=a)") and the corresponding PBA (e.g., "(PBA=A)"). The PBA is attached in the EHS 437 of the command UPIU 336;
(3) The UFS driver software 325 triggers the UFS host controller 115 to issue the command UPIU 336 to the UFS device 170;
(4) The UFS host controller 115 fetches the command UPIU 336 from the UFS host DRAM 230; and
(5) The UFS host controller 115 sends the command UPIU 336 to UFS device 170.

Figure 4B:
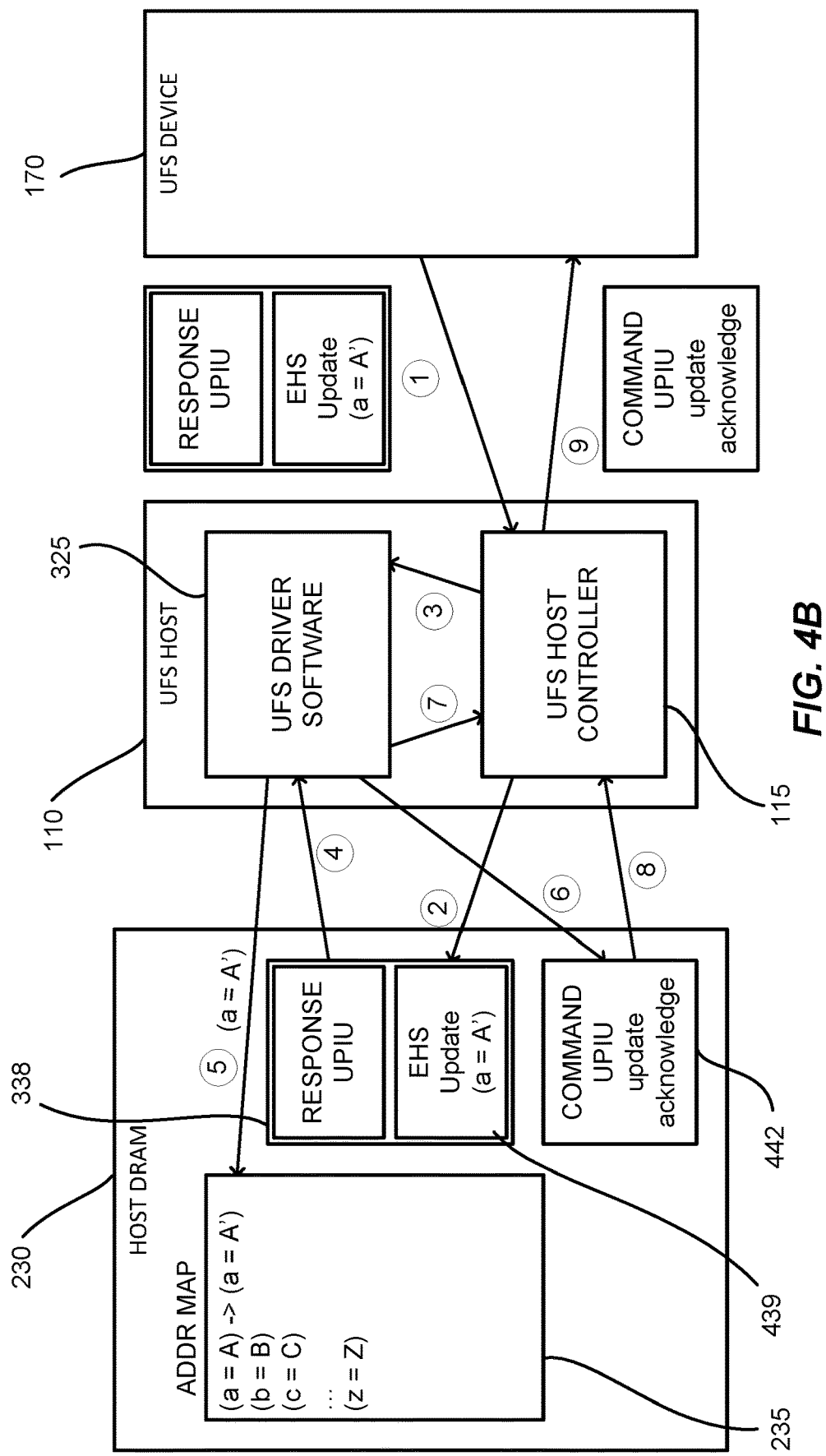

FIG. 4B illustrates an example of a software oriented operation sequence to update the address map 235. The UFS device 170 provides the map update information in an EHS 439 of a response UPIU 338. The UFS driver software 325 updates the address map 235 in the UFS host DRAM 230 accordingly, and sends a command UPIU 442 for the update acknowledge. The sequence of operations (represented by the circled numbers) performed by the UFS driver software 325 and the UFS host controller 115 are as follows:

(1) The UFS host controller 115 receives the response UPIU 338 from the UFS device 170. The response UPIU 338 includes a map update (e.g., "(a=A')") attached in the EHS 439 of the response UPIU 338;
(2) The UFS host controller 115 stores the response UPIU 338 in the UFS host DRAM 230;
(3) The UFS host controller 115 raises an interrupt to the UFS driver software 325 to indicate that a response has been received;
(4) The UFS driver software 325 checks the response UPIU 338 for pass/fail;
(5) If the response UPIU 338 contains the map update information, the UFS driver software 325 updates the address map 235 accordingly;
(6) The UFS driver software 325 prepares another command UPIU 442 for the map update acknowledge;
(7) The UFS driver software 325 triggers the UFS host controller 115 to issue the command UPIU 442 for the map update acknowledge to the UFS device 170;
(8) The UFS host controller 115 fetches the command UPIU 442 for the map update acknowledge from the UFS host DRAM 230; and
(9) The UFS host controller 115 sends the command UPIU 442 for the map update acknowledge to UFS device 170.

As seen, operations (1)-(3) in FIG. 4A and operations (3)-(7) in FIG. 4B are performed by the UFS driver software 325. This represents a significant amount of software overhead. Thus, software oriented implementation of HPB features may still suffer from performance issues.

Figure 5A:
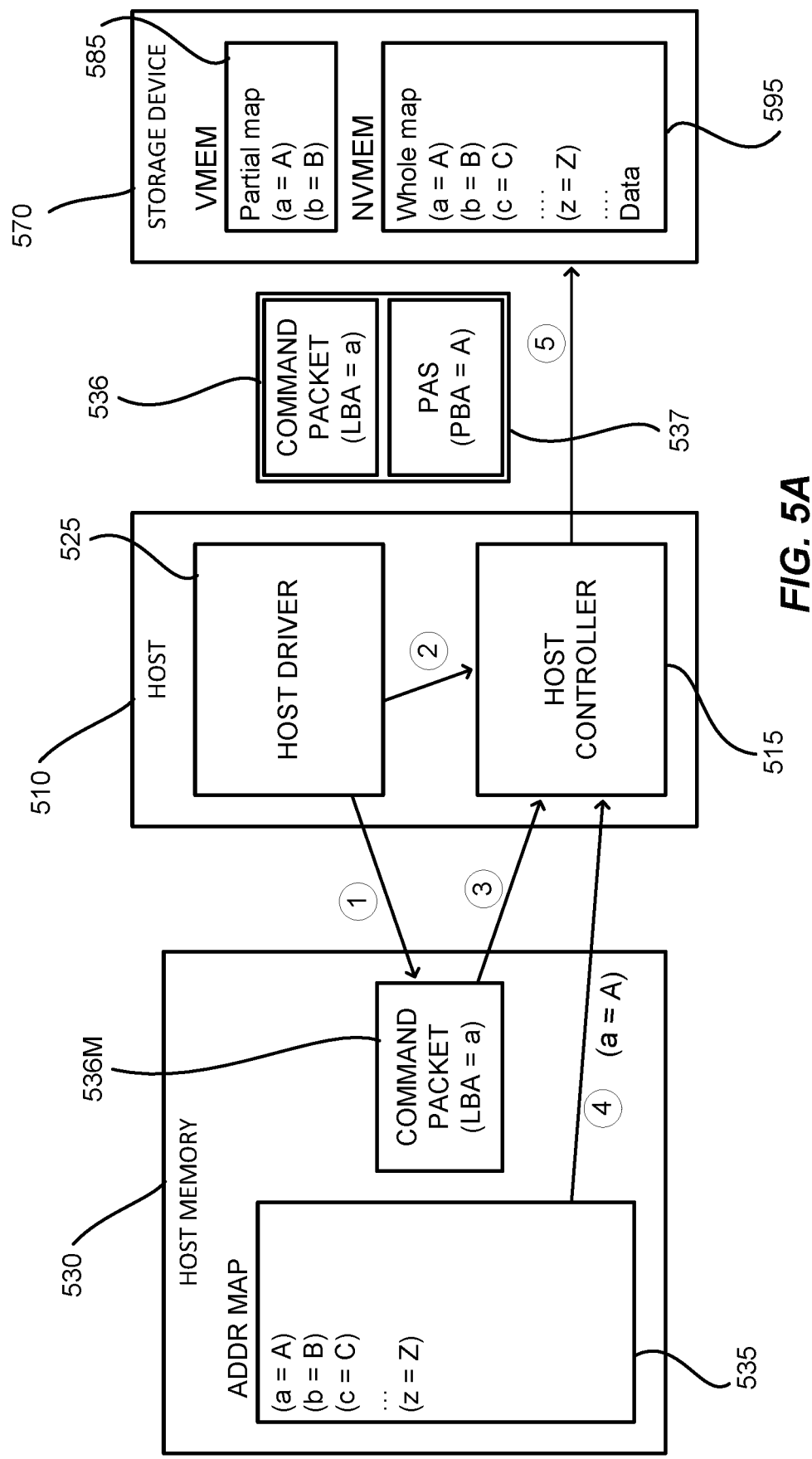
FIGS. 5A-5C illustrate examples of hardware oriented HPB handling.

To address such issues, in one or more aspects, it is proposed to provide hardware handling of the HPB features. FIG. 5A illustrates an example of a system to implement the HPB features in hardware. The system may include a host 510 and a storage device 570 configured to communicate with each other. For example, the host 510 and the storage device 570 may communicate over one or more lanes.

The host 510 may be an SoC (system-on-chip) and may include a host controller 515. In an aspect, the host controller 515 may be implemented in hardware. The host controller 515 may be configured to operate in compliance with the UFS standard. The host 510 may also include a host driver 525. In an aspect, the host driver 525 may be implemented as a combination of hardware and software. For example, a processor may execute instructions of a device driver software stored in a storage.

The storage device 570 may include a VMEM (volatile memory) 585 and an NVMEM (non-volatile memory) 595. SRAMs and DRAMS may be examples of the VMEM 585. Flash memories and magnetic RAMs may be examples of the NVMEM 595. Data may be stored in the NVMEM 595. Also, an entire L2P map of the of the storage device 570 may be stored in the NVMEM 595. A portion of the L2P map of the storage device 570 may be stored in the VMEM 585.

In operation, the storage device 570 may receive a command (e.g., read, write) from the host 510. If the command includes a physical address, then the storage device 570 may access the storage location specified by the physical address to service the command. When the physical address is provided, penalties associated with translating the logical address to the physical address can be avoided. Note that the logical and/or physical addresses may be individual storage addresses or may refer to memory blocks such LBAs and PBAs.

If the command includes the logical address but does not include the physical address, the storage device 570 may search the portion of the L2P map in the VMEM 585 to find the corresponding physical address. If the VMEM 585 does not currently hold the necessary portion of the L2P map, the storage device 570 may read the missing portion of the L2P map from the NVMEM 595 into the VMEM 585 and find the corresponding physical address. In an aspect, the storage device 570 may be configured to operate in compliance with the UFS standard.

The system may also include a host memory 530. The host 510 may be configured to directly access the host memory 530. For example, the host memory 530 may be integrated in the same SoC as the host 510 or may reside on a same board (e.g., same PCB (printed circuit board)) as the host 510. The host memory 530 may be volatile or non-volatile. For performance reasons, a volatile host memory 530 may be preferred.

In an aspect, the L2P map for the storage device 570 may be maintained in the host memory 530 as an address map 535. While not strictly required, it may be preferable store the entire L2P map of the storage device 570 in the host memory 530. That is, a size of the address map 535 maintained at the host memory 530 may be similar to a size of the L2P map within the NVMEM 595 of the storage device 570.

An example sequence of operations (represented by the circled numbers) performed by the host driver 525 and the host controller 515 may be as follows:

(1) The host driver 525 may prepare a command packet 536M in the host memory 530. The command packet 536M may include a target logical address (e.g., "(logical address=a)");
(2) The host driver 525 may trigger the host controller 515 to issue the command packet 536M to the storage device 570;
(3) The host controller 515 may fetch the command packet 536M from the host memory 530;
(4) The host controller 515 may find the physical address corresponding to the target logical address (e.g., (a=A)) from the address map 535 in the host memory 530, and may incorporate the corresponding physical address into the command packet 536; and
(5) The host controller 515 may send the command packet 536, including the incorporated physical address, to the storage device 570.

In FIG. 5A, the reference "536M" is used to refer to the command packet in the host memory 530 (e.g., see operation (1)), and the reference "536" (without the "M") is used to refer to the command packet sent to the storage device 570 (e.g., see operations (4) and (5)). As seen, the command packet 536M in the host memory 530 may include the target logical address, but may not include the corresponding physical address. On the other hand, the command packet 536 sent to the storage device 570 may include both the target logical address and the corresponding physical address. The corresponding physical address may be included in a command PAS (physical address segment) 537 of the command packet 536.

In an aspect, a command UPIU may be used to implement the command packet 536M. In another aspect, a command UPIU with an EHS may be used to implement the command packet 536 in which the EHS is used to implement the command PAS 537.

Note that in FIG. 5A, the HPB features may be handled entirely by the host controller 515—the host driver 525 is not required to access the address map 535 to find the corresponding physical address. There are at least the following advantages. First, software overhead associated with the HPB handling can be eliminated, or at least significantly reduced. Second, existing device drivers at the host side, which may be unaware of HPB, need not be changed. Third, less foot print may be required in the host memory 530 since the command packet 536M does not need to hold the physical address.

From time to time, the storage device 570 may update its L2P map (e.g., due to wear leveling). For consistency, the address map 535 for the storage device 570 should be updated as well. There are at least two ways to update the address map 535 in the host memory 530. In a first way, the storage device 570 may initiate the map update. In a second way, the host 510 may initiate the map update.

Figure 5B:
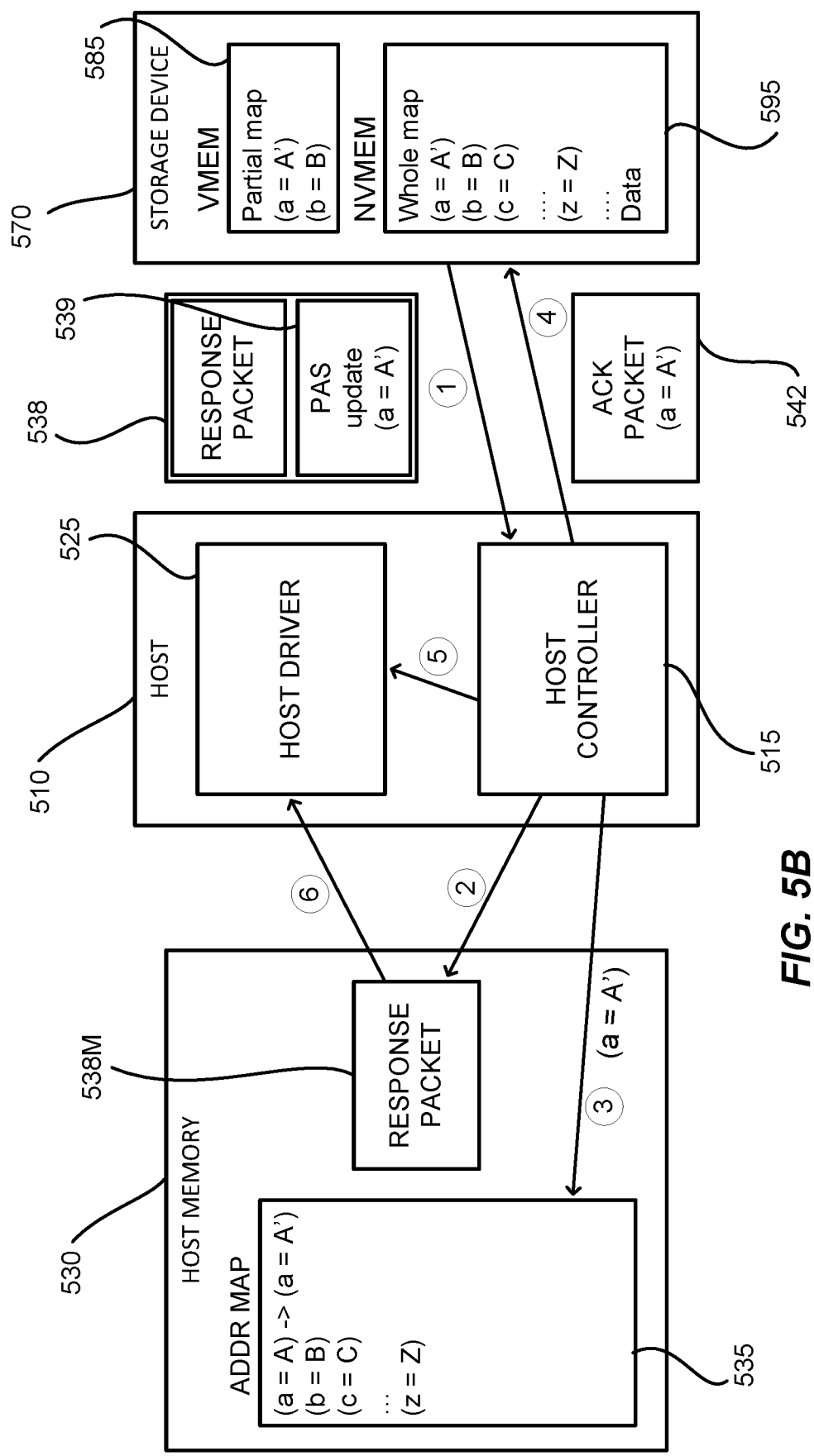

FIG. 5B illustrates an example of a device-initiated operation sequence to update the address map 535. In the device-initiated map update process, the storage device 570 may piggyback map update information in a response packet 538. In FIG. 5B, it may be assumed that the storage device 570 has piggybacked the map update information. The sequence of operations (represented by the circled numbers) performed by the host driver 525 and the host controller 515 may be as follows:

(1) The host controller 515 may receive the response packet 538, which includes the map update information (e.g., "update (a=A')"), from the storage device 570;
(2) The host controller 515 may store the response packet 538M in the host memory 530. The stored response packet 538M may be stripped of the map update information;
(3) The host controller 515 may update the address map 535 in accordance with the map update information;
(4) The host controller 515 may prepare and send to the storage device 570 an acknowledge packet 542 for the map update acknowledge;
(5) The host controller 515 may raise an interrupt to the host driver 525 to indicate that the response packet 538M is in the host memory 530; and
(6) The host driver 525 may check the response packet 538M for pass/fail.

In FIG. 5B, the reference "538M" is used to refer to the response packet stored in the host memory 530 (e.g., see operation (2)), and the reference "538" (without the "M") is used to refer to the response packet received from the storage device 570 (e.g., see operation (1)). As seen, the response packet 538 received from the storage device 570 may include a response PAS 539 that contains the map update information. Also as seen, the response packet 538M stored in the host memory 530 may be stripped of the response PAS 539.

In an aspect, a response UPIU with an EHS may be used to implement the response packet 538 received from the storage device 570 in which the EHS is used to implement the response PAS 539. In another aspect, a response UPIU without an EHS may be used to implement the response packet 538M stored in the host memory 530. In a further aspect, a command UPIU may be used to implement the acknowledge packet 542.

The HPB features in FIG. 5B may be handled entirely by the host controller 515—the host driver 525 is not required to update the address map 535. This again has the advantages of eliminating or reducing software overhead, simpler device drivers (e.g., host driver 525) at the host side, and less foot print in the host memory 530.

The following should be kept in mind. Referring back to FIG. 5A, while not shown, the host driver 525 can prepare multiple command packets 536M in the host memory 530. In other words, there can be other outstanding command packets 536M with the same "logical address=a". When the storage device 570 provides the map update information "update (a=A')", the storage device 570 may expect:

Before the acknowledgement for the (a=A') update is received from the host 510, the command packet 536 from the host 510 has the old mapping (physical address=A); and After the acknowledgement for the (a=A') update is received from the host 510, a subsequent command packet 536 from the host 510 has the new mapping (physical address=A').

The host controller 515 may be configured to comply with the expectation by:

Between operations (1) and (4) in FIG. 5B, for each outstanding command packet 536M that has (logical address=a), the command packet 536 is issued with the old mapping (physical address=A); and After operation (4), for each outstanding command packet 536M that has (logical address=a), a command packet 536 is issued with the new mapping (physical address=A').

To state it another way, prior to acknowledging the map update (e.g., before operation (4) of FIG. 5B), the command packet 536 sent to the storage device 570 (e.g., operation (5) of FIG. 5A) may include the old mapping (physical address=A) in the PAS 537. However, after acknowledging the map update (e.g., after operation (4) of FIG. 5B), a command packet 536 sent to the storage device 570 (e.g., operation (5) of FIG. 5A) may include the new mapping (physical address=A') in the PAS 537.

Figure 5C:
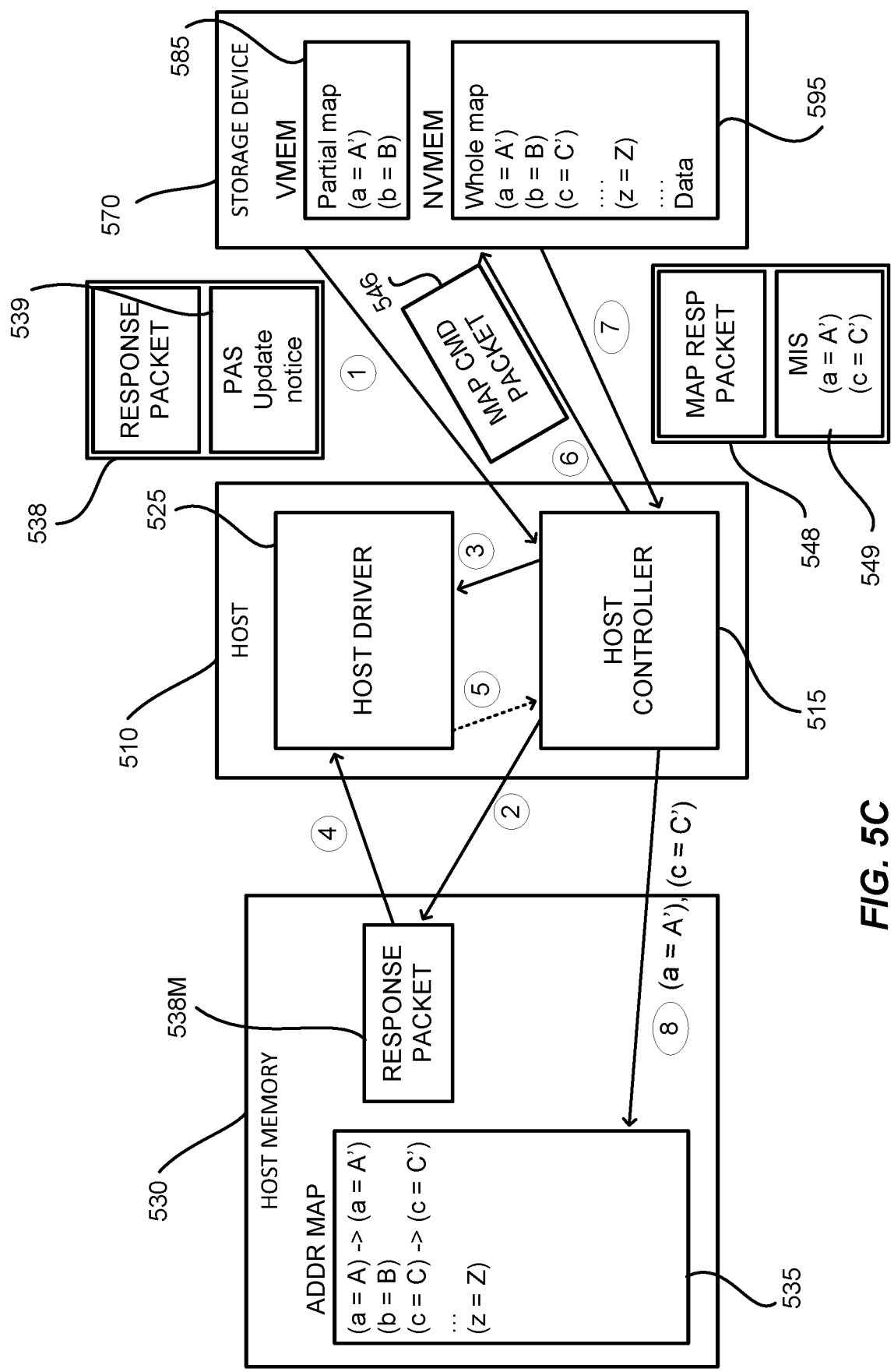

FIG. 5C illustrates an example of a host-initiated operation sequence to update the address map 535. In the host-initiated map update, the host 510 may command the storage device 570 to provide the map update information. In an aspect, the storage device 570 may notify the host 510 that the mapping within the storage device 570 has changed, and the host 510 may command the storage device 570 in response to the notification. In FIG. 5C, it may be assumed that the storage device 570 has piggybacked a map update notice in a response packet 538. The sequence of operations (represented by the circled numbers) performed by the host driver 525 and the host controller 515 may be as follows:

(1) The host controller 515 may receive the response packet 538, which includes the map update notice, from the storage device 570;

(2) The host controller 515 may store the response packet 538M in the host memory 530. The stored response packet 538M may be stripped of the map update notice;

(3) The host controller 515 may raise an interrupt to the host driver 525 to indicate that the response packet 538M is in the host memory 530;

(4) The host driver 525 may check the response packet 538M for pass/fail;

(5) The host driver 525 may trigger the host controller 515 to initiate the map update;

(6) The host controller 515 may generate and send a map command packet 546 to the storage device 570;

(7) The host controller 515 may receive a map response packet 548, which includes the map update information, from the storage device 570; and (8) The host controller 515 may update the address map 535 in accordance with the map update information.

In FIG. 5C, operation (5) is presented with a dashed arrow to indicate that operation (5) is optional. When operation (5) is not performed, the HPB features for the host-initiated map update may be handled entirely by the host controller 515. In this aspect, the host controller 515 may generate and send the map command packet 546 in operation (6) in response to the map update notice received in operation (1).

Alternatively, the host driver 525 may be involved to control when to initiate the map update. For example, if the host controller 515 is configured to wait for the trigger from the host driver 525, then the host driver 525 may effectively control the timing of the update by controlling when it issues the trigger to the host controller 515 in operation (5). In this alternative, the interrupt raised by the host controller 515 in operation (3) may also indicate that the map update notice has been received, and the host controller 515 may generate and send the map command packet 546 in operation (6) in response to the trigger received from the host driver 525 in operation (5).

As seen, the response packet 538 received from the storage device 570 may include a response PAS 539 that contains the map update notice. Also as seen, the response packet 538M stored in the host memory 530 may be stripped of the response PAS 539. The map response packet 548 may include an MIS (map information segment) 549 containing the map update information. The MIS 549 may include one or more map updates.

In an aspect, a response UPIU with an EHS may be used to implement the response packet 538 from the storage device 570 in which the EHS is used to implement the response PAS 539. In another aspect, a response UPIU without the EHS may be used to implement the response packet 538M stored in the host memory 530. In a further aspect, a command UPIU may be used to implement the map command packet 546. In yet another aspect, a response UPIU with an EHS may be used to implement the map response packet 548 in which the EHS is used to implement the MIS 549.

Figure 6A:
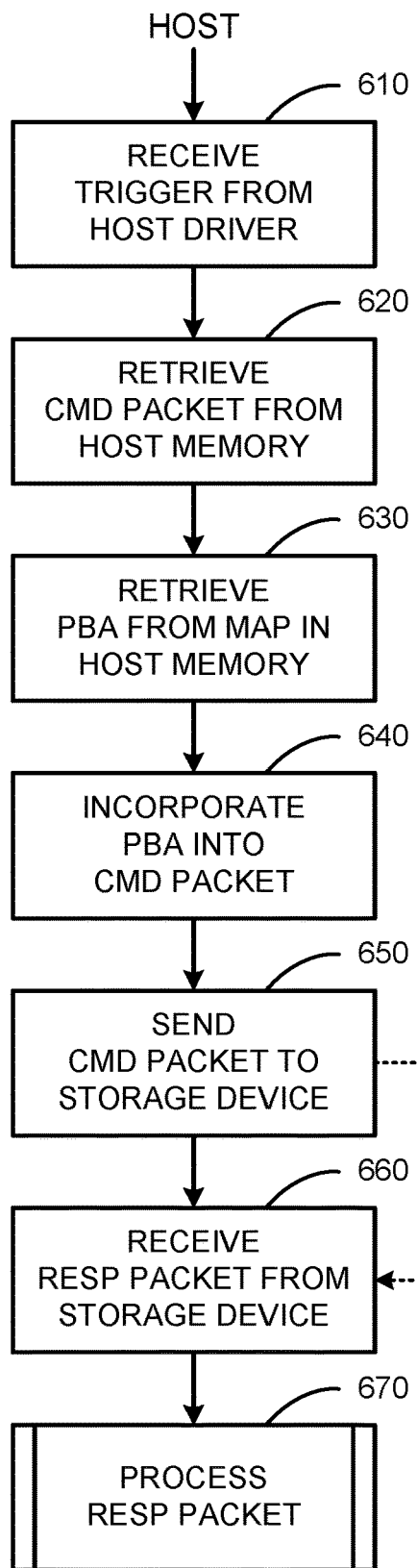
FIGS. 6A and 6B illustrate flow charts of an example method for hardware oriented HPB handling.
Figure 6B:
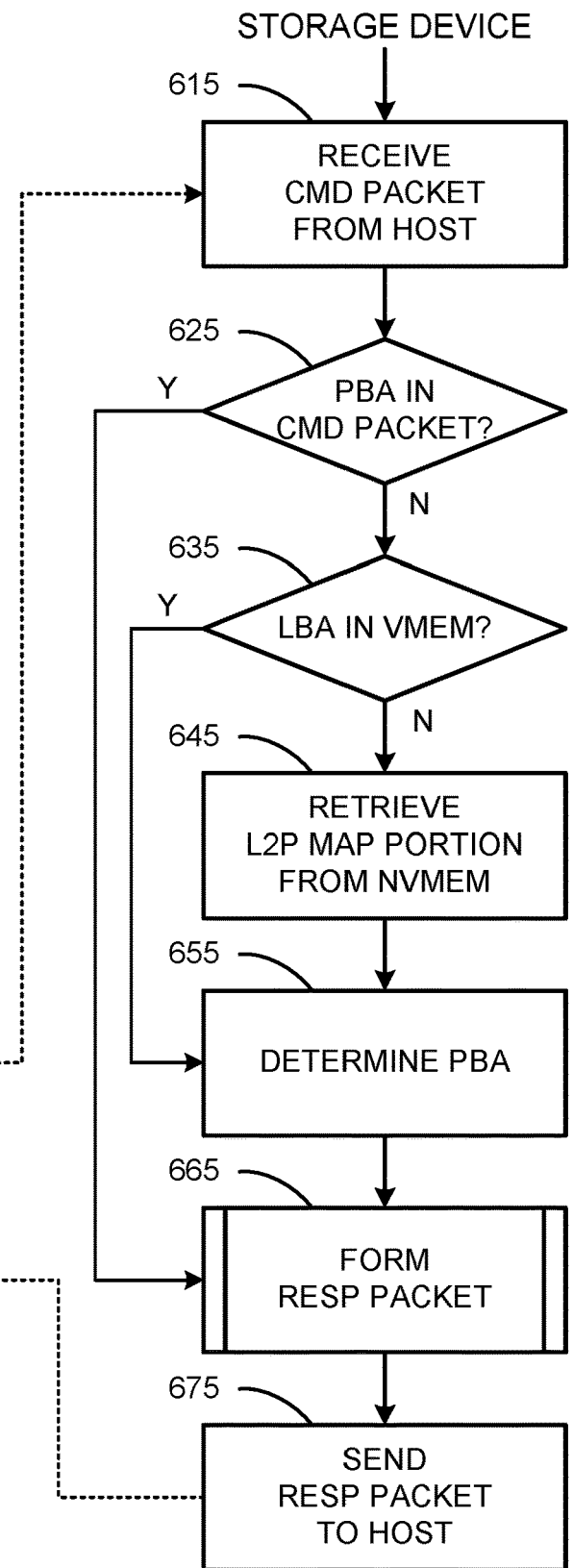

FIGS. 6A and 6B illustrate flow charts of example operations respectively performed by the host 510 and the storage device 570 for implementing the HPB features. Referring to FIG. 6A, in block 610, the host controller 515 may receive a trigger from the host driver 525 to issue a command packet 536M to the storage device 570. In block 620, the host controller 515 may retrieve the command packet 536M from the host memory 530. The command packet 536M may include a target logical address. In block 630, the host controller 515 may retrieve a physical address corresponding to the target logical address from the address map 535 in the host memory 530. In block 640, the host controller 515 may incorporate the physical address into the command packet 536. In block 650, the host controller 515 may send the command packet 536 to the storage device 570. This is indicated with a dashed connection arrow from block 650 to block 615.

Referring to FIG. 6B, in block 615, the storage device 570 may receive the command packet 536 from the host 510. In block 625, the storage device 570 may determine whether the physical address is included in the command packet 536. If the physical address is included in the command packet 536, then in block 665, the storage device 570 may form a response packet 538. If the physical address is not included in the command packet 536, then the storage device 570 in block 635 may determine whether the logical address specified in the command packet 536 is in the L2P map portion currently in the VMEM 585. If the specified logical address is in the VMEM 585, then the storage device 570 in block 655 may determine the corresponding physical address from the VMEM 585. If the specified logical address is not in the VMEM 585, then the storage device 570 in block 645 may retrieve the appropriate L2P map portion from the NVMEM 595 into the VMEM 585, and proceed to blocks 655 and 665.

In block 665, the storage device 570 may form a response packet 538 associated with the command packet 536 received in block 615. The response packet 538 may indicate whether the command (e.g., read, write) specified in the command packet 536 has or has not been successfully fulfilled. In block 675, the storage device 570 may send the response packet 538 to the host 510. This is indicated with a dashed connection arrow from block 675 to block 660.

Referring back to FIG. 6A, in block 660, the host controller 515 may receive the response packet 538 from the storage device 570. In block 670, the host controller 515 may process the response packet 538.

FIG. 7A illustrates a flow chart of example operations performed by the host controller 515 to perform block 670 of processing the response packet 538, and FIG. 7B illustrates a flow chart of example operations performed by the storage device 570 to perform block 665 of forming the response packet 538. In particular, FIGS. 7A and 7B illustrate example operations to perform the device-initiated map update.

Referring to FIG. 7B, in block 715, the storage device 570 may generate the response packet 538. As indicated above, the response packet 538 may indicate whether the command of the command packet 536 has been successfully fulfilled or not. In block 725, the storage device 570 may determine whether its L2P map has changed. For example, a wear leveling operation may have been performed for the NVMEM 595. If the L2P map has changed, then the storage device 570 in block 735 may incorporate map update information indicating the change into the response packet 538. The storage device 570 may then proceed to block 675 (see FIG. 6B) to send the response packet 538.

Referring to FIG. 7A, after receiving the response packet 538 from the storage device 570 in block 660 (see FIG. 6A), the host controller 515 in block 710 may store the response packet 538M in the host memory 530. The host controller 515 may strip the map update information before storing the response packet 538M. In block 720, the host controller 515 may raise an interrupt to the host driver 525 to indicate that a response has been received. In block 730, the host controller 515 may determine whether the received response packet 538 includes the map update information. If the response packet 538 does include the map update information, then the host controller 515 in block 740 may send an acknowledge packet 542 to the storage device 570. In block 750, the host controller 515 may update the address map 535 in accordance with the map update information.

FIG. 8A illustrates another flow chart of example operations performed by the host controller 515 to perform block 670, and FIG. 8B illustrates another flow chart of example operations performed by the storage device 570 to perform block 665. In particular, FIGS. 8A and 8B illustrate example operations to perform the host-initiated map update.

Referring to FIG. 8B, in block 815, the storage device 570 may generate the response packet 538. The response packet 538 may indicate whether the command of the command packet 536 has been successfully fulfilled or not. In block 825, the storage device 570 may determine whether its L2P map has changed. If the L2P map has changed, then the storage device 570 in block 835 may incorporate a map update notice into the response packet 538. The storage device 570 may then proceed to block 675 (see FIG. 6B) to send the response packet 538.

Referring to FIG. 8A, after receiving the response packet 538 from the storage device 570 in block 660 (see FIG. 6A), the host controller 515 in block 810 may store the response packet 538M in the host memory 530. The host controller 515 may strip the map update notice before storing the response packet 538M. In block 820, the host controller 515 may raise an interrupt to the host driver 525 to indicate that a response has been received. In block 830, the host controller 515 may determine whether the received response packet 538 includes the map update notice. If the response packet 538 does include the map update notice, then the host controller 515 in block 840 may generate the map command packet 546. In block 850, the host controller 515 may send the map command packet 546 to the storage device 570. This is indicated with a dashed connection arrow from block 850 to block 845.

Referring back to FIG. 8B, after sending the response packet 538 to the host 510 in block 675 (see FIG. 6B), the storage device 570 in block 845 may receive the map command packet 546 from the host 510. In block 855, the storage device 570 may form the map response packet 548. In block 865, the storage device 570 may send the map response packet 548 to the host 510. This is indicated with a dashed connection arrow from block 865 to block 860.

Referring again to FIG. 8A, in block 860, the host controller 515 may receive the map response packet 548 from the storage device 570. In block 870, the host controller 515 may update the address map 535 in accordance with the map update information included in the map response packet 548.

It should be noted that not all illustrated blocks of FIGS. 6A-8B need to be performed, i.e., some blocks may be optional. Also, the numerical references to the blocks of these figures should not be taken as requiring that the blocks should be performed in a certain order.

Figure 9:
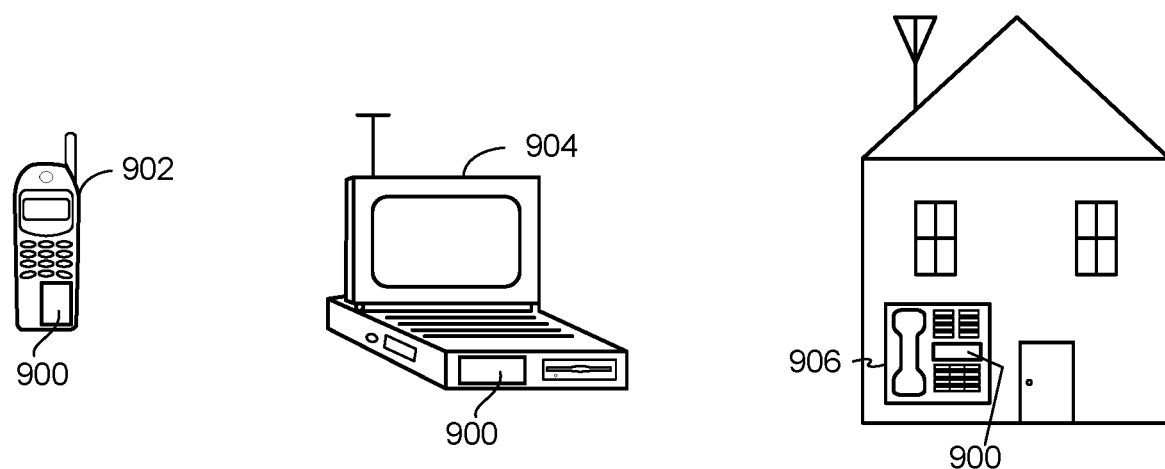
FIG. 9 illustrates examples of devices with a host and a plurality of devices daisy-chained to the host integrated therein.

FIG. 9 illustrates various electronic devices that may be integrated with the aforementioned apparatuses illustrated in FIGS. 4A and 4B. For example, a mobile phone device 902, a laptop computer device 904, a terminal device 906 as well as wearable devices, portable systems, that require small form factor, extreme low profile, may include a device/package 900 that incorporates the apparatuses as described herein. The device/package 900 may be, for example, any of the integrated circuits, dies, integrated devices, integrated device packages, integrated circuit devices, device packages, integrated circuit (IC) packages, package-on-package devices, system-in-package devices described herein. The devices 902, 904, 906 illustrated in FIG. 9 are merely exemplary. Other electronic devices may also feature the device/package 900 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the examples disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled with the processor such that the processor can read information from, and write information to, the storage medium. In the alternative, the storage medium may be integral to the processor.

Accordingly, an aspect can include a computer-readable media embodying any of the devices described above. Accordingly, the scope of the disclosed subject matter is not limited to illustrated examples and any means for performing the functionality described herein are included.

While the foregoing disclosure shows illustrative examples, it should be noted that various changes and modifications could be made herein without departing from the scope of the disclosed subject matter as defined by the appended claims. The functions, processes and/or actions of the method claims in accordance with the examples described herein need not be performed in any particular order. Furthermore, although elements of the disclosed subject matter may be described or claimed in the singular, the plural is contemplated unless limitation to the singular is explicitly stated.

What is claimed is:

1. An apparatus, comprising:
 a host configured to communicate with a storage device, the host comprising:
  a host controller configured to communicate with a host driver and with the storage device; and
  a host memory configured to store an address map for the storage device, the address map comprising one or more L2P (logical-to-physical) address translation entries for the storage device,
 wherein the host controller is configured to:
  retrieve a command packet prepared by the host driver from the host memory, the command packet targeting a logical address of a storage location of the storage device,
  retrieve a physical address of the storage device mapped to the logical address from the address map, and
  send the command packet to the storage device, the sent command packet having the physical address incorporated therein, and
 wherein the command packet in the host memory prior to being retrieved by the host controller does not include the physical address.

2. The apparatus of claim 1, wherein the host controller is implemented in hardware.

3. The apparatus of claim 1, wherein the host driver is implemented through a processor executing instructions of a device driver software.

4. The apparatus of claim 1, wherein the host controller is configured to:
 receive a response packet from the storage device,
 store the response packet in the host memory,
 raise an interrupt to the host driver indicating that the response packet is in the host memory,
 determine if the response packet includes a map update information, and
 upon determining that the response packet includes the map update information, update the address map in the host memory based on the map update information in the response packet.

5. The apparatus of claim 4, wherein the host controller is configured to strip the map update information from the response packet prior to storing the response packet in the host memory.

6. The apparatus of claim 4, wherein upon determining that the response packet includes the map update information, the host controller is configured to send an acknowledge packet to the storage device, the acknowledge packet indicating an acknowledgment of a receipt of the map update information.

7. The apparatus of claim 6, wherein the acknowledge packet is not stored in the host memory.

8. The apparatus of claim 1, wherein the host controller is configured to:
 receive a response packet from the storage device,
 store the response packet in the host memory,
 raise an interrupt to the host driver indicating that the response packet is in the host memory,
 determine if the response packet includes a map update notice, and
 upon determining that the response packet includes the map update notice,
  send a map command packet based on the map update notice to the storage device,
  receive a map response packet corresponding to the map command packet from the storage device, and
  update the address map in the host memory based on a map update information in the map response packet.

9. The apparatus of claim 8, wherein the host controller is configured to strip the map update notice from the response packet prior to storing the response packet in the host memory.

10. The apparatus of claim 1, wherein the host controller is configured to operate in compliance with a universal flash storage (UFS) standard.

11. The apparatus of claim 1, wherein the apparatus is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

12. The apparatus of claim 1, wherein the host controller is configured to retrieve the command packet from the host memory in response to receiving a trigger from the host driver after the command packet has been prepared in the host memory by the host driver.

13. An apparatus, comprising:
a host and a storage device configured to communicate with each other,
wherein the host comprises:
a host controller configured to communicate with a host driver and with the storage device; and
a host memory configured to store an address map for the storage device, the address map comprising one or more L2P (logical-to-physical) address translation entries for the storage device, and
wherein the host controller is configured to:
retrieve a command packet prepared by the host driver from the host memory, the command packet targeting a logical address of a storage location of the storage device,
retrieve a physical address of the storage device mapped to the logical address from the address map, and
send the command packet to the storage device, the sent command packet having the physical address incorporated therein, and
wherein the command packet in the host memory prior to being retrieved by the host controller does not include the physical address.

14. The apparatus of claim 13,
wherein the host controller is implemented in hardware, and
wherein the host driver is implemented through a processor executing instructions of a device driver software.

15. The apparatus of claim 13, wherein the storage device comprises:
a VMEM (volatile memory) configured to store at least a portion of an L2P map of the storage device; and
an NVMEM (non-volatile memory) configured to store data and an entirety of the L2P map of the storage device,
wherein the storage device is configured to:
receive the command packet from the host,
access the NVMEM in accordance with the physical address in the command packet, and
send a response packet to the host, the response packet indicating a success or a failure of accessing the NVMEM.

16. The apparatus of claim 15,
wherein the storage device is configured to:
determine if the L2P map of the storage device has changed, and
upon determining that the L2P map has changed, incorporate a map update information into the response packet such that the response packet sent to the host includes the map update information, the map update information reflecting the change or changes to the L2P map, and
wherein the host controller is configured to:
receive the response packet from the storage device,
store the response packet in the host memory,
raise an interrupt to the host driver indicating that the response packet is in the host memory, and
update the address memory in the host memory based on the map update information in the response packet.

17. The apparatus of claim 16, wherein the host controller is configured to strip the map update information from the response packet prior to storing the response packet in the host memory.

18. The apparatus of claim 16, wherein the host controller is configured to send an acknowledge packet to the storage device, the acknowledge packet indicating an acknowledgment of a receipt of the map update information.

19. The apparatus of claim 15,
wherein the storage device is configured to:
determine if the L2P map of the storage device has changed,
upon determining that the L2P map has changed, incorporate a map update notice into the response packet such that the response packet sent to the host includes the map update notice, the map update notice indicating that the L2P map has changed,
receive a map command packet from the host, and
send a map response packet to the host, the map response packet including a map update information reflecting the change or changes to the L2P map, and
wherein the host controller is configured to:
receive the response packet from the storage device,
store the response packet in the host memory,
raise an interrupt to the host driver indicating that the response packet is in the host memory,
send the map command packet to the storage device,
receive the map response packet from the storage device, and
update the address map in the host memory based on the map update information in the map response packet.

20. The apparatus of claim 19, wherein the host controller is configured to strip the map update information from the response packet prior to storing the response packet in the host memory.

21. The apparatus of claim 13, wherein one or both of the host controller and the storage device are configured to operate in compliance with a universal flash storage (UFS) standard.

22. The apparatus of claim 13, wherein the apparatus is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

23. The apparatus of claim 13, wherein the host controller is configured to retrieve the command packet from the host memory in response to receiving a trigger from the host driver after the command packet has been prepared in the host memory by the host driver.

24. A method of an apparatus comprising a host and storage device configured to communicate with each other, the method comprising:
retrieving, by a host controller of the host, a command packet prepared by a host driver of the host from a host memory of the host, the command packet targeting a logical address of a storage location of the storage device;

retrieving, by the host controller, a physical address of the storage device mapped to the logical address from an address map for the storage device stored in the host memory, the address map comprising one or more L2P (logical-to-physical) address translation entries for the storage device; and sending, by the host controller, the command packet to the storage device, the sent command packet having the physical address incorporated therein, wherein the command packet in the host memory prior to being retrieved by the host controller does not include the physical address, wherein the host controller is implemented in hardware, and wherein the host driver is implemented through a processor executing instructions of a device driver software.

25. The method of claim 24, further comprising:
receiving, by the storage device, the command packet from the host;
accessing, by the storage device, an NVMEM (non-volatile memory) of the storage device in accordance with the physical address in the command packet,
generating, by the storage device, a response packet indicating a success or a failure of accessing the NVMEM, and
sending, by the storage device, the response packet to the host.

26. The method of claim 25, further comprising:
determining, by the storage device, if an L2P map of the storage device has changed;
incorporating, by the storage device, a map update information into the response packet upon determining that the L2P map has changed such that the response packet sent to the host includes the map update information, the map update information reflecting the change or changes to the L2P map;
receiving, by the host controller, the response packet from the storage device;
storing, by the host controller, the response packet in the host memory;
raising, by the host controller, an interrupt to the host driver indicating that the response packet is in the host memory;
updating, by the host controller, the address map in the host memory based on the map update information in the response packet; and
sending, by the host controller, an acknowledge packet to the storage device, the acknowledge packet indicating an acknowledgment of a receipt of the map update information.

27. The method of claim 26, further comprising stripping, by the host controller, the map update information from the response packet prior to storing the response packet in the host memory.

28. The method of claim 25, further comprising:
determining, by the storage device, if an L2P map of the storage device has changed;
incorporating, by the storage device, a map update notice into the response packet upon determining that the L2P map has changed such that the response packet sent to the host includes the map update notice, the map update notice indicating that the L2P map has changed;
receiving, by the host controller, the response packet from the storage device;
storing, by the host controller, the response packet in the host memory;
raising, by the host controller, an interrupt to the host driver indicating that the response packet is in the host memory;
sending, by the host controller, a map command packet to the storage device based on the map update notice;
receiving, by the storage device, the map command packet from the host;
sending, by the storage device, a map response packet to the host, the map response packet including a map update information reflecting the change or changes to the L2P map;
receiving, by the host controller, the map response packet from the storage device; and
updating, by the host controller, the address map in the host memory based on the map update information in the map response packet.

29. The method of claim 24, further comprising:
receiving a trigger from the host driver after the command packet has been prepared in the host memory by the host driver,
wherein the host controller retrieves the command packet from the host memory in response to receiving the trigger from the host driver.

30. An apparatus, comprising:
a host configured to communicate with a storage device, the host comprising:
means for communicating with a host driver and with the storage device; and
means for storing an address map for the storage device, the address map comprising one or more L2P (logical-to-physical) address translation entries for the storage device,
wherein the means for communicating:
retrieves a command packet prepared by the host driver from the means for storing, the command packet targeting a logical address of a storage location of the storage device;
retrieves a physical address of the storage device mapped to the logical address from the address map; and
sends the command packet to the storage device, the sent command packet having the physical address incorporated therein,
wherein the command packet in the means for storing prior to being retrieved by the means for communicating does not include the physical address,
wherein the means for communicating is implemented in hardware, and
wherein the host driver is implemented through a processor executing instructions of a device driver software.

31. The apparatus of claim 30, wherein the means for communicating:
retrieves a response packet from the storage device;
stores the response packet in the means for storing;
raises an interrupt to the host driver indicating that the response packet is in the means for storing;
updates the address map in the means for storing based on a map update information in the response packet; and
sends an acknowledge packet to the storage device, the acknowledge packet indicating an acknowledgment of a receipt of the map update information.

32. The apparatus of claim 31, wherein the means for communicating strips the map update information from the response packet prior to storing the response packet in the means for storing.

33. The apparatus of claim 30, wherein the means for communicating:
- receives a response packet from the storage device;
- stores the response packet in the means for storing;
- raises an interrupt to the host driver indicating that the response packet is in the means for storing;
- sends a map command packet to the storage device based on a map update notice in the response packet;
- receives a map response packet from the storage device; and
- updates the address map in the means for storing based on a map update information in the map response packet.

34. The apparatus of claim 33, wherein the means for communicating strips the map update notice from the response packet prior to storing the response packet in the means for storing.

35. The apparatus of claim 30, wherein the means for communicating retrieves the command packet from the means for storing in response to receiving a trigger from the host driver after the command packet has been prepared in the means for storing by the host driver.

\* \* \* \* \*